US012669162B2

(12) United States Patent
Skarra

(10) Patent No.: US 12,669,162 B2
(45) Date of Patent: Jun. 30, 2026

(54) SHOCK ABSORBER/DAMPER DEVICE WITH A SOLENOID OPERATED VALVE ELEMENT AND A MAGNETIC FLUX-BYPASS NOSE FOR INFLUENCING MAGNETIC FORCES DURING SWITCHING OPERATIONS

(71) Applicant: SUSPENSION RESEARCH INNOVATION B.V., Oss (NL)

(72) Inventor: Poul Skarra, Kouklia (CY)

(73) Assignee: SUSPENSION RESEARCH INNOVATION B.V., Oss (NL)

( * ) Notice: Subject to any disclaimer, the term of this patent is extended or adjusted under 35 U.S.C. 154(b) by 360 days.

(21) Appl. No.: 18/033,984

(22) PCT Filed: Oct. 26, 2021

(86) PCT No.: PCT/EP2021/079680
§ 371 (c)(1),
(2) Date: Apr. 26, 2023

(87) PCT Pub. No.: WO2022/090226
PCT Pub. Date: May 5, 2022

(65) Prior Publication Data
US 2023/0407939 A1 Dec. 21, 2023

(30) Foreign Application Priority Data
Oct. 27, 2020 (NL) ...................................... 2026778

(51) Int. Cl.
*F16F 9/46* (2006.01)
*F16F 9/34* (2006.01)
(52) U.S. Cl.
CPC .............. *F16F 9/464* (2013.01); *F16F 9/466* (2013.01)

(58) Field of Classification Search
CPC .... F16F 9/464; F16F 9/466; F16F 9/34; F16F 9/3405
See application file for complete search history.

(56) References Cited

U.S. PATENT DOCUMENTS 3,168,242 A * 2/1965 Rudolf ................... G05D 23/24
                                                         236/78 D
4,539,542 A * 9/1985 Clark .................... H01F 7/1607
                                                          335/262
(Continued)

FOREIGN PATENT DOCUMENTS

DE       3922891 A1    1/1991
EP       1413811 A1    4/2004
(Continued)

OTHER PUBLICATIONS

International Search Report for PCT/EP2021/079680 dated Jan. 5, 2022 (4 pages).

*Primary Examiner* — Thomas W Irvin
(74) *Attorney, Agent, or Firm* — Tutunjian & Bitetto, P.C.

(57) ABSTRACT

A shock absorber/damper device includes a piston-cylinder assembly and a solenoid valve assembly of which one of the stationary and movable pole parts includes a flux-bypass nose that projects forwardly away from its first pole face and that on one side is delimited by a first sidewall that extends parallel to an axial direction. The other one of the stationary and movable pole parts includes a second sidewall that extends parallel to the axial direction and that projects backwardly away from its second pole face. The flux-bypass nose fits onto or into the other one of the stationary and movable pole parts in the axial direction with a sliding fit of their parallel sidewalls along each other.

20 Claims, 10 Drawing Sheets

(56)                    References Cited

U.S. PATENT DOCUMENTS

| | | | | |
|---|---|---|---|---|
| 4,604,600 | A * | 8/1986 | Clark | H01F 7/13 |
| | | | | 335/279 |
| 5,066,980 | A * | 11/1991 | Schweizer | H01F 7/13 |
| | | | | 400/157.2 |
| 6,601,822 | B2 * | 8/2003 | Tachibana | F16K 31/0613 |
| | | | | 137/625.69 |
| 7,874,541 | B2 * | 1/2011 | Abe | H01F 7/13 |
| | | | | 335/297 |
| 9,168,808 | B2 * | 10/2015 | Lindeman | B60G 17/08 |
| 9,347,579 | B2 * | 5/2016 | Gieras | H01F 7/081 |
| 9,859,047 | B2 * | 1/2018 | Gieras | F16K 31/0675 |
| 11,022,232 | B2 * | 6/2021 | Paulus | H01F 7/1638 |
| 12,287,023 | B2 * | 4/2025 | Kobayashi | F16F 9/46 |
| 2005/0029063 | A1 * | 2/2005 | Neumann | F16F 9/46 |
| | | | | 188/317 |
| 2009/0008586 | A1 * | 1/2009 | Abe | H01F 7/13 |
| | | | | 251/129.2 |
| 2014/0116825 | A1 * | 5/2014 | Lindeman | F16F 9/464 |
| | | | | 188/266.2 |
| 2023/0287955 | A1 * | 9/2023 | Nakano | F16F 9/466 |

FOREIGN PATENT DOCUMENTS

| | | | |
|---|---|---|---|
| EP | 1848013 | A1 | 10/2007 |
| WO | 2012070932 | A1 | 5/2012 |

* cited by examiner

SHOCK ABSORBER/DAMPER DEVICE WITH A SOLENOID OPERATED VALVE ELEMENT AND A MAGNETIC FLUX-BYPASS NOSE FOR INFLUENCING MAGNETIC FORCES DURING SWITCHING OPERATIONS

FIELD OF THE INVENTION

The present invention relates to shock absorbers/damper devices with piston-cylinder assemblies and main and/or bypass channels for damping medium to flow between chambers at respective sides of their piston during compression and rebound strokes, as well as with a solenoid valve assembly for proportionally opening or closing one or more of the main and/or bypass channels. The invention is aimed to influence the shock absorbing/damping characteristics.

BACKGROUND TO THE INVENTION

Shock absorbers/damper devices are known in various embodiments. For example WO-2012/070932 shows a damper device for which the damping force can be varied using an electromagnetically actuated closing member with which a bypass channel can be closed or opened. The electromagnetic actuation comprises a magnetic loop with a movable closing member and a stationary guiding member that comprise opposing pole faces with an air gap between them. The opposing pole faces here are made with such complementary male and female profiles that an increasing amount of magnetic saturation shall automatically start to occur therein when the pole face of the closing member moves towards the pole face of the guiding member. Consequently, an increase in magnetic forces that is normally attributed to a decrease in air gap between the pole faces during such a closing movement now gets partly counteracted or compensated by an increase in magnetic reluctance due to the increasing magnetic saturation. In order to obtain this increasing magnetic saturation, the complementary male and female profiles of the pole faces may be conical, tapered, arcuate or pointed.

A disadvantage hereof is that the functioning of this known shock absorber/damper device leaves to be desired and needs improvement. The saturation is responsible for residual magnetism, also called remanence, that remains behind in the profiled male and female profiles of the pole faces. If such remanence occurs, a form of magnetic hysteresis is inevitable, which leads to damping hysteresis in the case that the closing member gets electromagnetically actuated from a higher degree of energization towards a fixed degree of energization and later from a lower degree of energization towards that same fixed degree of energization. Saturation and residual magnetism then makes it difficult if not impossible to accurately reproduce the damping characteristics at that fixed degree of energization because that can only be reached if the movable closing member can be repositioned at exactly the same position at the same corresponding degree of energization.

Another disadvantage is that the speed of adjustment of the damping characteristics via the opening or closing of the bypass-channel creates restrictions. This has to do with the automatically occurring saturation during switching on and with the thereafter inevitable remaining residual magnetism during switching off. Both effects slow down the back and forth switching movements of the closing member relative to the guiding member.

Yet another disadvantage is the construction of WO-2012/070932. Its components are relative difficult and expensive to manufacture and assemble, and there is merely any space available for a spring that needs to bias the closing element away from the guiding element in the non-energized situation. Residual magnetism is always less than energized magnetism. The bias spring rate is determined and defined by the energized magnetic force. Residual magnetism may prevent the valve to close completely after preceded energization. This is not only disadvantageous when switching off but also when switching to a lower degree of energization. In both cases said residual magnetism may prevent the valve to close completely.

Furthermore the closing member of this known device will start to vibrate in its own natural frequency when bumped against. This leads to disturbing and undesired effects.

SUMMARY OF THE INVENTION

The present invention aims to overcome those disadvantages at least partly or to provide a usable alternative. In particular the present invention aims to provide a user-friendly shock absorber/damper device of which the damping characteristics can be quickly and accurately adjusted without any kinds of negative side-effects being able to occur.

According to the present invention this aim is achieved by a shock absorber/damper device according to claim 1. The shock absorber/damper device comprises a piston-cylinder assembly of which the piston separates the cylinder in a first and second chamber. Main and/or bypass channels are provided for damping medium to flow through from the first towards the second chamber and vice versa during compression and rebound strokes. Furthermore, a solenoid valve assembly is provided that comprises a valve element that is movable in a first axial direction and that is configured to proportionally open or close one or more of the channels, and a solenoid operator for operating the valve element. The solenoid operator comprises a coil for generating a magnetic field, and a substantially closed magnetic circuit for guiding the magnetic field generated by the coil. The magnetic circuit comprises stationary and movable pole parts that have first and second pole faces lying opposite each other with an air gap there between in the first axial direction. The movable pole part is associated with the valve element and is moveable relative to the stationary pole part against the action of a spring in the first axial direction in dependence of electric current being fed to the solenoid operator. According to the inventive thought one of the stationary and movable pole parts comprises a flux-bypass nose that projects forwardly away from its first pole face and that on one side is delimited by a first sidewall that extends parallel to the first axial direction. The other one of the stationary and movable pole parts then comprises a second sidewall that also extends parallel to the first axial direction and that projects backwardly away from its second pole face. The flux-bypass nose is configured to fit onto or into the other one of the stationary and movable pole parts in the first axial direction with a sliding fit of their parallel sidewalls along each other, such that in dependence of the electric current being fed to the solenoid operator, the air gap between the opposing pole faces closes while magnetic forces between those two pole faces decrease due to said parallel sidewalls sliding along each other and forming an increasing sideways directed bypass surface area for magnetic flux.

Thus advantageously it has become possible to truly quickly and accurately adjust the damping characteristics of the shock absorber/damper device without negative side-effects of residual magnetism caused by magnetic saturation being able to occur between the movable and stationary pole parts. When, during energization of the solenoid, the pole face of the movable pole part starts to approach the pole face of the stationary pole part, the magnetic flux bypass route gets larger and easier to choose for a growing amount of magnetic field lines to follow. This shall cause the magnetic attraction forces between the pole faces to gradually decrease, the more the air gap between them closes.

This decrease in magnetic attraction force shall go on up till a certain minimum air gap is reached between the opposing pole faces, of for example 0.5 mm. A stopper can be provided for preventing the movable pole part to have its pole face move further towards the pole face of the stationary part than this minimum air gap, because otherwise from there electromagnets are known to have their attraction force increase progressively, which is not desired here.

Owing to the gradually increasing amount of flux bypassing the pole faces via the nose that is positioned sideways thereof, and the thus gradually decreasing amount of flux remaining available to flow over the air gap between the opposing pole faces, very stable positions can be obtained for the movable pole part and thus for the valve element in dependence of various amounts of energization. This is advantageously obtained owing to substantially linear decreasing magnetic attraction force-air gap lines in dependence of their corresponding amount of energization, each getting to cross an increasing linear spring force-way line at relative large angles of inclination. This means that the movable pole part is able to quickly reach its aimed position and be firmly kept in exactly that aimed position that then fully corresponds to that cross point where the spring force and magnetic attraction forces are in balance with each other.

The provision of the flux-bypass nose that automatically shall get to increasingly have magnetic flux pass through it during a switching operation, also means that a maximum magnetic attraction force between the pole faces is to occur in the starting position when the air gap is largest and the overlap between the parallel side walls is minimum or even close to zero. This shall cause the movable pole part to immediately start moving due to this maximum magnetic attraction force between the pole faces as soon as the solenoid is energized, which makes it possible to obtain truly fast switching times, that are mainly determined by how fast electric power can be built up by the coil.

Owing to the invention, in this manner the typical magnetic forces get manipulated in a way that adds to the speed of movement of the movable pole part and thus of the valve element, as well as the dynamic accurate proportional and repeatable positioning of the movable pole part and thus of the valve element in dependence of the amount of energization of the solenoid operator.

It is noted that EP-1848013 shows a flow control valve with a proportional solenoid of which both a fixed and a movable yoke portion are formed with nose portions sliding along each other. An outer one of the nose portions is sharply pointed. An inner one of the nose portions is blunt. A front wall of this blunt nose portion forms a pole face that lies axially opposite a pole face surrounded by the sharply pointed nose portion. No axially opposing pole faces are present here that circumvent the nose portions, making the valves switching behaviour different from the one according to the present invention for shock absorber/damper devices.

According to the present invention, the main and/or bypass channels can be separate channels that run outside the cylinder of the piston-cylinder system. Preferably however they extend through the piston and/or piston rod.

In order to obtain aimed damping characteristics, one or more of the main and/or bypass channels can be provided with throttling elements for throttling the damping medium to flow via them from the first towards the second chamber and vice versa during those compression and rebound strokes.

In order to further influence the aimed damping characteristics, one or more of the main and/or bypass channels can be quickly and easily proportionally opened or closed by the solenoid operator for controlling the amount of damping medium to flow via them from the first towards the second chamber and vice versa during the compression and rebound strokes.

The solenoid operator then can be mounted on one side of the piston, for example between the piston and the piston rod, such that it gets to move along with them during the compression and rebound strokes.

In a preferred embodiment the flux-bypass nose may have decreasing cross-sectional dimensions seen in the first axial direction forwardly away from its first pole face. The more surface area in parallel sidewalls getting to lie opposite one another, the thicker the nose becomes. This helps to prevent magnetic saturation to occur or start occurring inside the nose.

The decreasing cross-section of the nose may for example be formed by an inclined wall. The nose end then however preferably is configured to have such an inclined wall and the nose's parallel sidewall not ending with a sharp pointed edge, in order to not make it too vulnerable in getting damaged, and in order to provide right from the starting position enough magnetic flux guiding nose material to prevent the undesired saturation from happening.

According to the invention, the flux-bypass nose is be annular shaped, while the parallel first and second side walls are cylindrical shaped, wherein all lie around a central axis that extends in the first axial direction. The parallel sidewalls of the flux-bypass nose and the other one of the movable and stationary pole parts then get to be cylindrical and the sliding fit between them advantageously results in a perfect centring of the movable pole part during its switching movements.

According to the invention, the first sidewall faces outwardly and, at its inward end, is circumvented by said first pole face, and the second sidewall faces inwardly and, at its outward end, is circumvented by said second pole face. Since the first sidewall is defined as the one that forms part of the flux-bypass nose, this means that the flux-bypass nose gets to fit inside the other one of the movable and stationary pole parts. This has the advantage that the outer circumferences of the movable and stationary parts can both be made with a same diameter or cross-sectional dimension. The nose does not stand in the way of that. Furthermore this brings the advantage that the opposing pole faces can get to lie at relative large cross-sectional dimensions such that they can be maximised within the available space.

The pole faces may have all kinds of shapes or profiles. Preferably however, the first and second pole faces extend flat in a second radial direction that is perpendicular to said first axial direction. This orientation shall help to make the magnetic attraction forces between the opposing flat pole faces maximum in the starting position when the parallel sidewalls have not or only created a minimum of overlap for forming the flux-bypass route through the nose.

The movable pole part preferably may have a cylindrical outer shape while being movably guided back and forth with a sliding fit in the first axial direction inside a sleeve of non-magnetic flux guiding material that at least partially extends through a centre coil space. The sleeve then can be made thin-walled and of a material that has a lower thermal expansion coefficient than the movable pole part. This helps to prevent the movable pole part of getting stuck.

In another preferred embodiment the valve element may be formed by a slider configured to slide in the first axial direction along one or more flow through holes of the one or more of the channels it is to proportionally open or close. This orientation brings the advantage that the closing or opening of those channels by the slider then shall be less influenced by a flow of the damping medium. This makes the damping characteristics to be quicker, easier and more accurate to adjust.

In addition the slider can be formed by a cylindrical portion of the movable pole part, wherein the one or more flow through holes of the one or more channels to be proportionally opened or closed by it, then can be provided in a part of the sleeve of non-magnetic flux guiding material that is configured to extend outside the centre coil space. This combined use of the sleeve saves in number of components and makes the construction more economic and reliable.

In a preferred embodiment the flux-bypass nose may be provided on the stationary pole part. This makes it possible to keep the movable pole part lightweight and simple. For example the movable pole part then can be made substantially cylindrical while delimiting a central hollow and with a maximum wall thickness that is equal to the radial dimension of its second pole face, whereas the stationary pole part then can be given a maximum thickness that is equal to the radial dimension of its first pole face added with the maximum thickness of the flux-bypass nose.

In another preferred embodiment connection ducts can be provided in the stationary and/or movable pole part for connecting the air gap between the pole faces with the damping medium in the one or more channels to be proportionally opened or closed. In the case of a movement or vibration of the movable pole part relative to the stationary pole part, the volume in the air gap between the pole faces may vary. If the movable pole part moves towards the stationary pole part, then damping medium needs to be transported away from the air gap. If the movable pole part moves away again from the stationary pole part, then damping medium needs to be transported towards the air gap. The connection ducts make this flowing of damping medium towards and away from the air gap well possible. The cross-sectional dimensions of the connection ducts can be chosen such that a critical amount of desired damping on this flow of damping medium towards and away from the air gap is achieved. This may play an important role in preventing the closing member against starting to vibrate in its own natural frequency when bumped against. Furthermore this may help to prevent vacuum bubble formation in the damping medium during a quick moving of the movable pole part in the direction away from the stationary pole part.

The connection ducts for connecting the air gap between the pole faces with the damping medium in the one or more channels, can for example be provided in the flux-bypass nose, wherein those connection ducts in the nose on one side may be connected to the air gap and on the other side then may connect to a central hollow inside the movable pole part that in turn can be in open connection with the damping medium in said channels.

A guiding rod, in particular an adjustable guiding rod, can be provided that at one end is connected to the stationary pole part, that extends with the spring lying around it through the central hollow inside the movable pole part, and that forms a guidance for at least an abutment of the spring, which abutment is connected with or limited by the movable pole part. Thus the hollow space inside the movable pole part can be optimally used by the spring, which owing to that can be made relative long and/or with a relative large number of windings in the case of a helical spring being used. This makes the spring safer and more reliable.

In an embodiment a flow guider cap may be positioned spaced in front of an axially directed part of the one or more channels to be proportionally opened or closed towards a radially directed part of them. This flow guider cap for example can be provided on the free end of the abovementioned guiding rod, and is aimed to inhibit turbulences from starting to occur in the one or more channels in an open position of the valve element.

Further preferred embodiments of the invention are stated in the present application.

BRIEF DESCRIPTION OF THE DRAWINGS

The invention shall now be explained in more detail below by means of describing an exemplary embodiment in a non-limiting way with reference to the accompanying drawings, in which.

DETAILED DESCRIPTION

Figures 1, 2:
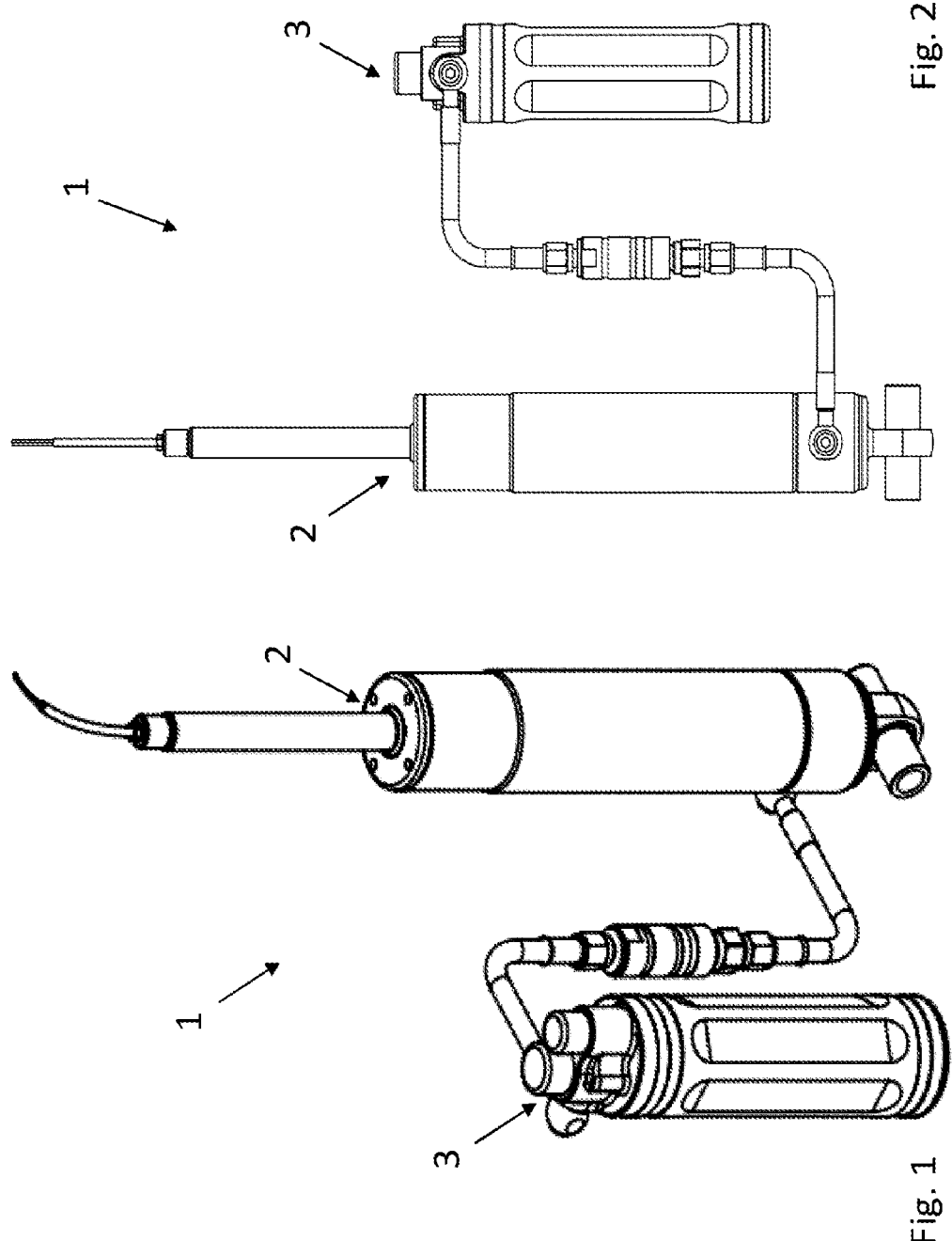
FIG. 1 shows a perspective view of a shock absorber/damper device according to the invention.
FIG. 2 shows a front view of FIG. 1.

In FIGS. 1 and 2 a shock absorber/damper device is shown that has been given the reference numeral 1. The device 1 comprises a piston-cylinder assembly 2 and a buffer reservoir 3 filled with hydraulic damping medium, in particular oil. The piston-cylinder assembly 2 is configured to be connected between a sprung mass and an unsprung mass.

For example it can be configured to be connected between parts of a vehicle, like between a body/chassis and wheel/brakes of such a vehicle.

Figure 3B:
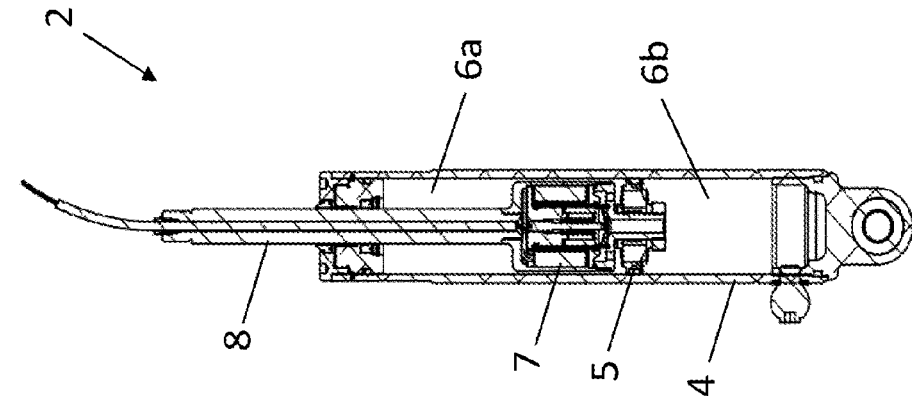
FIG. 3b shows a longitudinal-sectional view of the piston-cylinder assembly of FIG. 1 in a half compressed state.
Figure 3A:
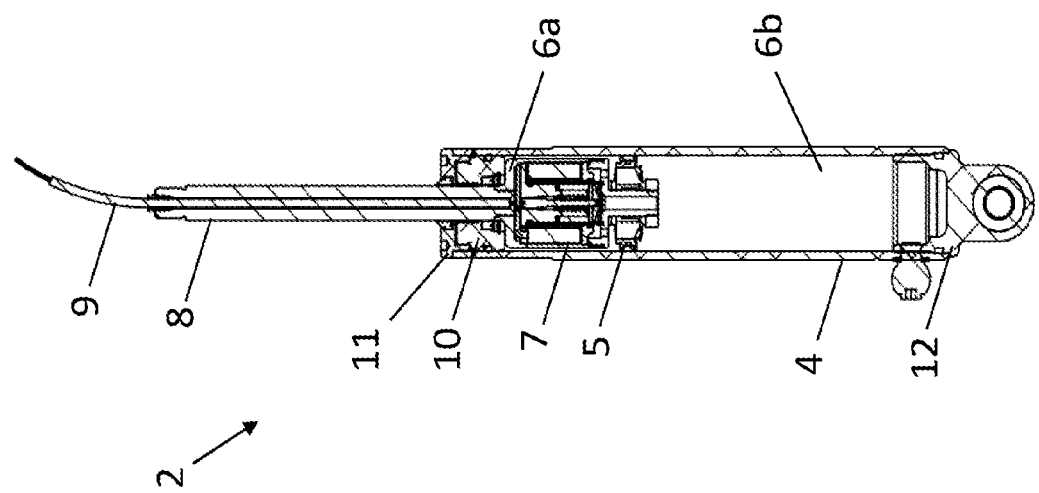
FIG. 3a shows a longitudinal-sectional view of the piston-cylinder assembly of FIG. 1 in a fully extended state.

As can best be seen in FIGS. 3a and 3b, the piston-cylinder assembly 2 has a longitudinal centre axis and comprises a cylinder 4 and a piston 5. The piston 5 separates the cylinder 4 in a first chamber 6a and a second chamber 6b. The chambers 6a, 6b are filled with the hydraulic damping medium, for which one of them is connected to the reservoir 3. The piston 5 is connected to a solenoid valve assembly 7 that in turn is connected to a piston rod 8. Wiring 9 for energizing the solenoid valve assembly 7 is guided through a hollow inside the piston rod 8.

The piston rod 8 is movably guided through a sealing retainer 10 and first end cap 11 that closes off the cylinder 4 at one end. At its other end the cylinder 4 is closed off by a second end cap 12.

The piston 5 and solenoid valve assembly 7 are movable in an axial direction through the cylinder 4 during compression and rebound strokes. With that the piston rod 8 gets to move further into and out of the cylinder 4. FIG. 3a shows the fully extended state of the piston rod 8 relative to the cylinder 4, whereas FIG. 3b shows a half compressed state between the two of them.

During such compression and rebound strokes, the hydraulic damping medium gets forced to flow from the first chamber 6a towards the second chamber 6b and vice versa. For this the piston 5 in a conventional manner is provided with a plurality of restricted main channels 15 that extend in the axial direction through the piston 5, such that they form restricted flow connections between the chambers 6a, 6b through which the hydraulic damping medium can flow. See also FIG. 4-6. Some of the main channels 15 are throttled by elastically deformable shims 16a at their upper side and some of the main channels 12 are throttled by elastically deformable shims 16b at their lower side. In this way the hydraulic damping medium aiming to flow between the chambers 6a, 6b, because of pressure differences building up during said compression and rebound strokes, automatically is restricted/throttled to a certain amount, which determines an important part of the damping characteristics of the device.

Besides those restricted main channels 15, also a proportionally openable/closable bypass channel 18 is provided. This bypass channel 18 extends partly 18' in the axial direction along the centre axis through a centre tubular portion 19a of a valve housing 19, and partly 18" in the radial outward direction through a widening portion 19b of the valve housing 19. At the side of the tubular portion 19a, the bypass channel 18 is in open flow connection with the second chamber 6b via an inlet/outlet opening 21. At the side of the widening portion 19b, the bypass channel 18 is in open flow connection with the first chamber 6b via a plurality of axially directed outlet/inlet openings 22. Thus the bypass channel 18 also may form a flow connection between the chambers 6a, 6b through which the hydraulic damping medium can flow. A valve element 23, that shall be explained later on, is provided that is configured to proportionally open or close the bypass channel 18. For this, the valve element 23 is operable by the solenoid valve assembly 7 in dependence of amounts of electric current being fed thereto. In this way the hydraulic damping medium aiming to flow between the chambers 6a, 6b, because of pressure differences building up during said compression and rebound strokes, also can be given the option to flow at a controllable rate through the bypass channel 18. Thus another important part of the damping characteristics can be electronically controlled.

The piston 5 comprises a centre hollow with which it is placed over the tubular portion 19a of the valve housing 19. The piston 5 is kept in place via a locking nut 24 that is screwed onto a threaded section of the tubular portion 19a of the valve housing 19.

The solenoid valve assembly 7 comprises a solenoid housing 25 that connects with a circumferential outer wall part 25a to the widening portion 19b of the valve housing 19. The piston rod 8 is connected by means of a screw threaded connection inside a capping part 25b of the solenoid housing 25. Inside the thus formed solenoid housing 25, a coil 26 is housed. The coil 26 is connected with the wiring 9 such that upon energization an electromagnetic field is generated.

A substantially closed magnetic circuit is provided for guiding the magnetic field in a sort of donut shape around the coil 26. The components of this magnetic circuit are all made out of magnetic flux guiding material, like steel. The components of the magnetic circuit comprise:

a plate shaped portion 27a of a stationary pole part 27 that extends in a radial direction along a head end of the coil 26;

a cylindrical portion 27b of the stationary pole part 27 that extends in the axial direction through a first section of a centre coil space;

a cylindrical portion 28a of a movable pole part 28 that extends in the axial direction partly through a second section of the centre coil space and partly outside this coil space;

a plate shaped portion 19c of the valve housing 19 that extends in a radial direction along the other head end of the coil 26;

a circumferential outer wall portion 25a of the solenoid housing 25.

The cylindrical portion 27b of the stationary pole part 27 and the cylindrical portion 28a of the movable pole part 28 have same outer diameters Do and are placed inside a sleeve 30 of non-magnetic flux guiding material that extends in the axial direction with a first part 30a through the entire centre coil space, and with a second part 30b outside the centre coil space. The movable pole part 28 thus is guided with a sliding fit in the axial direction through the sleeve 30. The second part 30b of the sleeve 30 extends as a blocking wall through the widening portion 19b of the valve housing 19, and is equipped with a number of through holes that are divided around its circumference.

Figure 4:
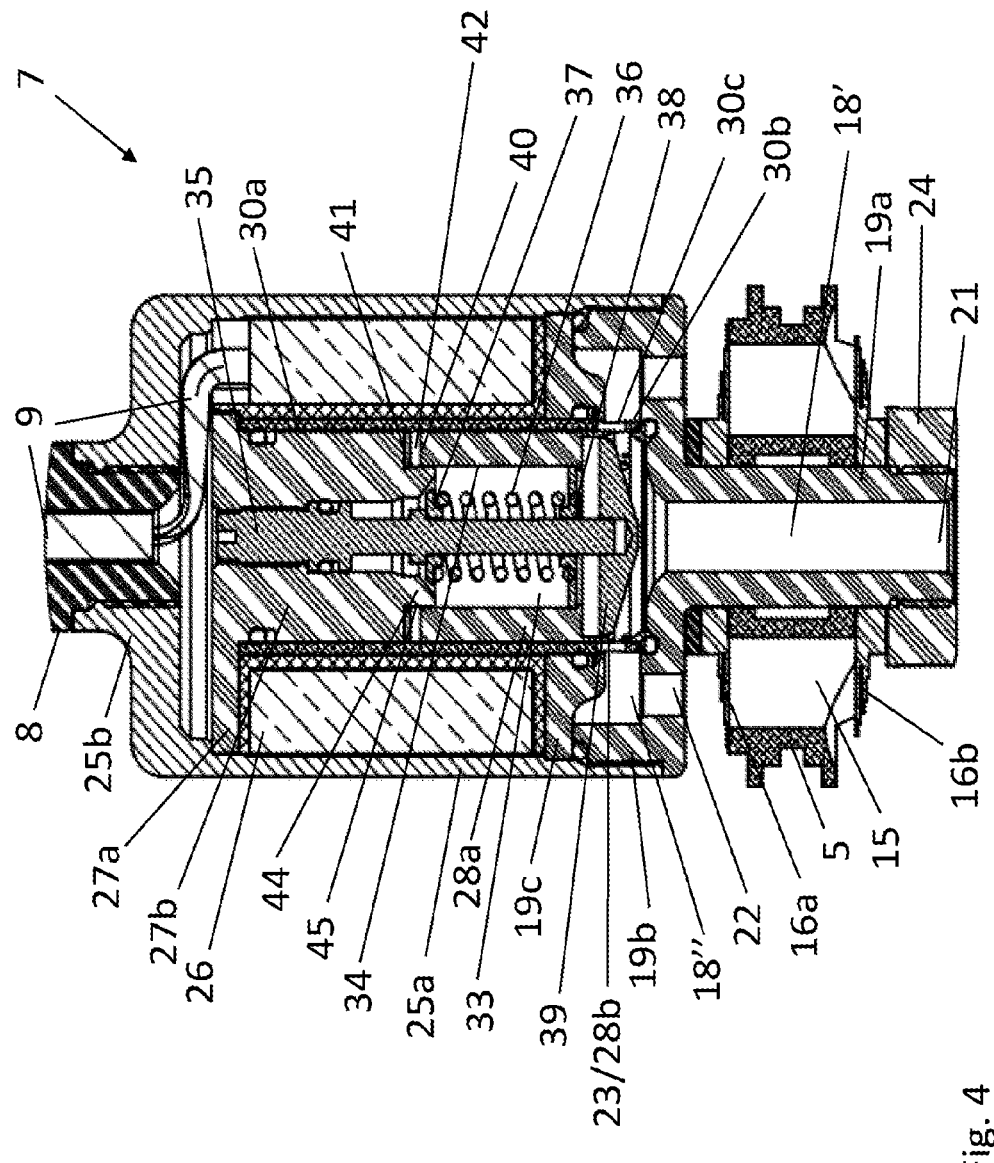
FIG. 4 shows the solenoid valve assembly and piston of FIG. 3 with the valve element half opened.

The movable pole part 28 not only forms an essential component of the magnetic circuit. An end portion 28b of the movable pole part 28 at the same time forms a slider that functions as the abovementioned valve element 23 and that is configured to proportionally open or close the bypass channel 18 by sliding in the axial direction to a bigger or lesser degree in front of the through holes 30c. In FIG. 4 a half open position is shown for the slider/valve element 23, whereas in FIG. 5 a fully closed, and in FIG. 6 a fully opened position are shown.

The movable pole part 28 delimits a cylindrical centre hollow 33 with an inner sidewall 34 that extends straight parallel to the axial direction and that has an inner diameter Di. An adjustable guiding rod 35 extends through the centre hollow 33. One end of the rod 35 is adjustably connected by means of a screw threaded connection inside a female threaded portion of centre hole in the stationary pole part 27. Around the part of the rod 35 that extends through the centre hollow 33, a helical spring 36 lies around it. The spring 36 is locked up between a dish 37 that abuts against a flange of the rod 35, and a dish 38 that abuts against a ridge of the movable pole part 28 while being slidable along the rod 35. Thus the movable pole part 28 is biased away from the stationary pole part 27 by means of the spring 36.

A cone-shaped flow guider cap 39 is connected to the free other end of the rod 35. The flow guider cap 39 is positioned spaced in front of the axially directed part 18' of the bypass channel 18 and aids in gradually forcing a flow of damping medium from the axially directed part 18' towards the radially directed through holes 30c in the widening part 18" of the bypass channel 18 during compression strokes, or in the opposite direction from the radially directed through holes 30c in the widening part 18" towards the axially directed part 18' of the bypass channel 18 during rebound strokes.

It is noted that the end portion 28b of the movable pole part 28 that also forms the slider/valve element 23, is provided with an enlarged portion of the centre hollow 33 that fits with a sliding fit over the cone-shaped flow guider cap 39.

According to the inventive thought of the invention, opposing end portions of the stationary and movable pole parts 27, 28 are specifically constructed for being able to repeatedly switch the slider/valve element 23 proportionally in an accurate manner.

For this purpose, the end portion of the movable pole part 28 has an annular flat pole face 40 that starts at the outer diameter Do of its cylindrical portion 28a and from there extends straight radially inwards to the diameter Di of its inner sidewall 34.

Furthermore for this purpose, the end portion of the stationary pole part 27 has an annular flat pole face 41 that starts at the outer diameter Do of its cylindrical portion 27b and from there extends straight radially inwards to the diameter Di. Thus the two pole faces 40 and 41 truly lie opposite one another. An air gap 42 is present between them.

Even further for this purpose, the stationary pole part 27 comprises an annular flux-bypass nose 44 that starts at the inner diameter Di of the pole face 41 and from there projects in the axial direction forwardly away from its pole face 41. The nose 44 on its outer circumferential side is delimited by an outer sidewall 45 that extends straight parallel to the axial direction. The nose 44 on its inner circumferential side is delimited by an inner sidewall 46 that extends angled relative to the axial direction, here approximately an angle of 45 degrees. Thus the flux-bypass nose 44 has decreasing cross-sectional dimensions seen in the axial forward direction. It's front end here does not end sharp but is made blunt with a flat portion extending in the radial direction perpendicular to its outer sidewall 45.

The flux-bypass nose 44 fits with a sliding fit of its outer sidewall 45 along the inner sidewall 34 of the centre hollow 33 inside the movable pole part 28.

In dependence of a certain amount of electric current being fed to the coil 26, the movable pole part 28 shall take in a certain stable position relative to the stationary pole part 27 that corresponds to a balance being achieved between the magnetic attraction forces between the pole faces 40, 41 in the one axial direction and the spring forces between the stationary and movable pole parts 27, 28 in the opposite axial direction.

Figure 5:
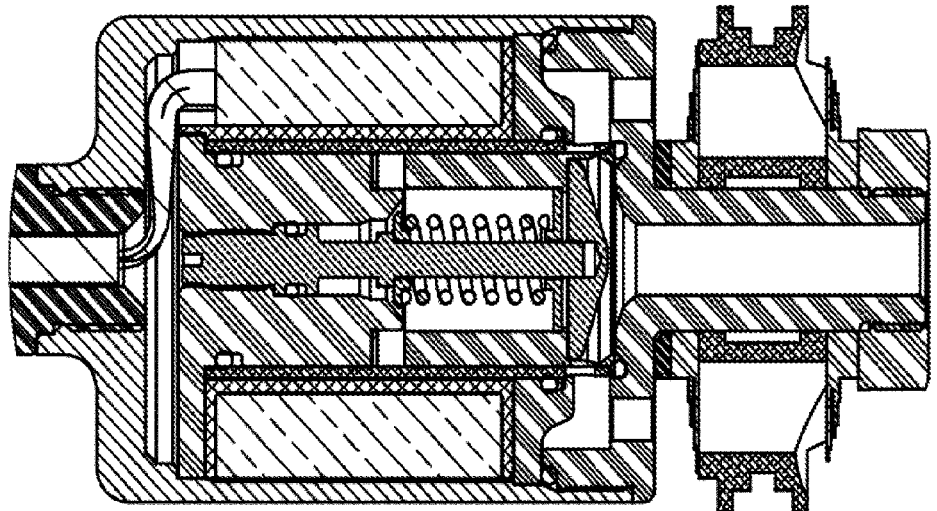
FIG. 5 shows the solenoid valve assembly and piston of FIG. 3 with the valve element fully closed.
Figure 6:
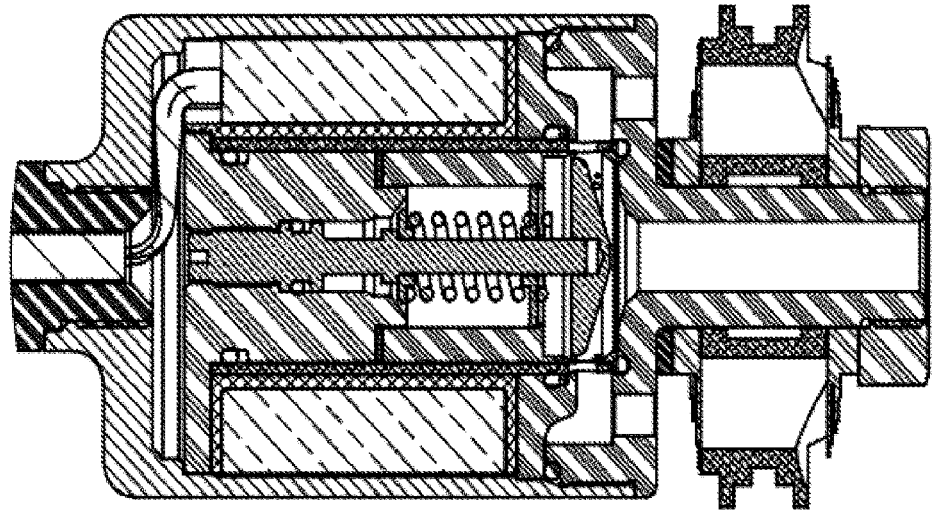
FIG. 6 shows the solenoid valve assembly and piston of FIG. 3 with the valve element fully opened.

This certain position corresponds to a certain width of the air gap 42 between the opposing pole faces 40, 41 and thus to a certain amount of opening/closing of the slider/valve element 23, as can be seen in FIG. 4-6.

Figure 7:
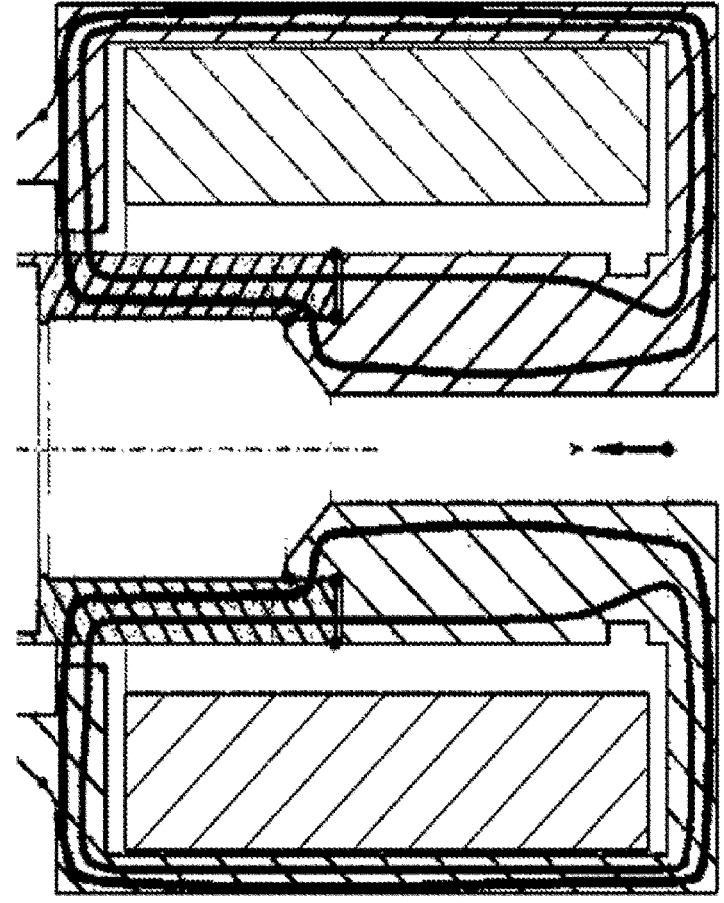
FIG. 7 schematically shows the flux-main and the flux-bypass routes in a for the switching position as shown in FIG. 6.

This certain position also corresponds to a certain amount of overlap between the opposing sidewalls 34 and 45 and thus to a certain amount of magnetic flux bypassing the route over the air gap 42 between the opposing pole faces 40, 41, and instead going through the flux-bypass nose 44, as can be seen in FIG. 7.

Figures 8, 9:
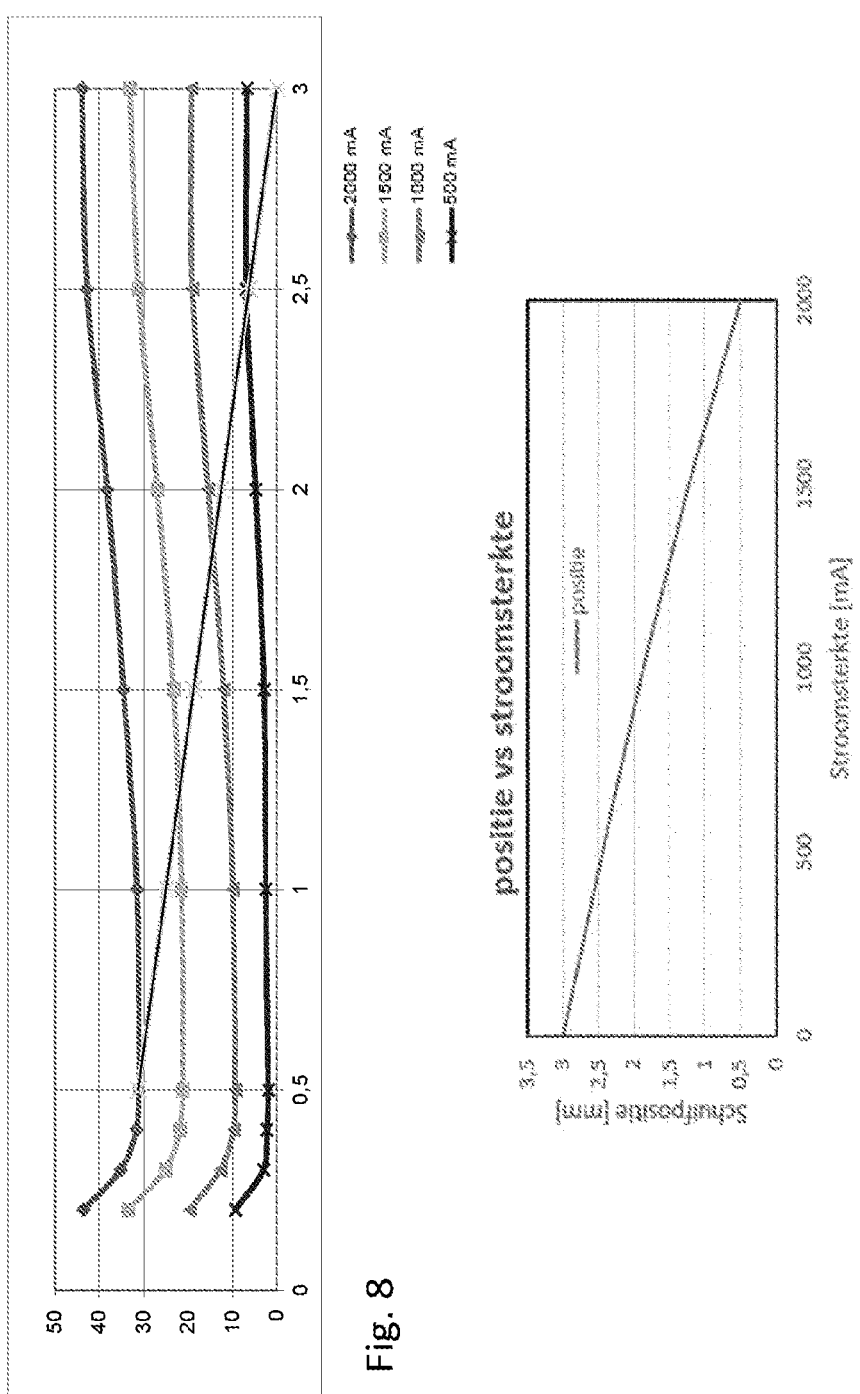
FIG. 8 shows a graph of magnetic and spring forces in relation to an air gap width between pole faces of the solenoid for four amounts of current being fed to a coil of the solenoid valve assembly.
FIG. 9 shows a graph of a position of a valve element of the solenoid valve assembly in relation to the amount of current being fed to a coil of the solenoid valve assembly.

In FIG. 8 it can be seen for four distinctive amounts of current starting to be fed to the coil 26, that for each of them the starting magnetic attraction force (shown at the right side of the graph) in the starting position is maximum. This starting position corresponds to the one that is shown in FIG. 5. The air gap 42 then is biggest, here 3 mm. In that starting position there is no overlap between the sidewall 45 of the flux-bypass nose 44 on the stationary pole part 27 and the sidewall 34 of the hollow 33 inside the movable pole part 28. Thus no or hardly no magnetic flux then is able to bypass the route between the opposing pole face 40, 41 over the air gap 42. This means that substantially all available magnetic flux, that is generated by the coil 26 and that corresponds to the amount of current being fed to the coil 26, as it were is forced to flow along this route between the opposing pole face 40, 41 over the air gap 42, and thus maximally attribute to the magnetic attraction force there between.

Owing to this maximum magnetic attraction force between the pole faces 40, 41 the movable pole part 28 and thus also its slider/valve element 23, shall quickly start to move at high speed towards the stationary pole part 27. The smaller the air gap 42 then however gets, the larger the overlap between the sidewalls 34, 45, and the bigger the portion of all available magnetic flux that then as an alternative starts to follow the route over those overlapping sidewalls 34, 45 through the flux-bypass nose 44. This causes the magnetic attraction forces between the pole faces 40, 41 to gradually decrease the smaller the air gap 42 gets to be. See the intermediate part of the graph.

At the same time the spring force of the spring 36 shall increase in a linear manner the smaller the air gap 42 gets. In the starting position this spring force is minimum, here close to zero.

In the graph it can be seen that the lower the amount of current being fed to the coil, the sooner the balance between the decreasing magnetic attraction force and the increasing spring force shall be obtained (larger air gap 42 and smaller amount of closing of the medium flow bypass channel 18 by the slider/valve element 23), and that the higher the amount of current being fed to the coil, the later the balance between the decreasing magnetic attraction force and the increasing spring force shall be obtained (smaller air gap 42 and larger amount of closing of the medium flow bypass channel 18 by the slider/valve element 23).

At the left side of the graph it can also be seen that when the air gap 42 should get to be smaller than a certain minimum, here 0.5 mm, the magnetic force would start to increase progressively. In order to prevent this from being able to happen, a spacer of non-magnetic flux guiding material, here messing, and of a thickness that corresponds to the minimum desired air gap 42 to occur, is placed on top of the pole face 41.

Advantageously the configuration with the coil 26, flux-bypass nose 44 and the characteristics of the spring 36 is such that a linear relation between the position of the slider/valve element 23 relative to the amount of current fed to the coil 26 is obtained. This is shown in FIG. 9, and makes the relationship between the through holes 30c and the slider/valve element 23 less complex to be designed.

Thus according to the invention not only truly stable positions for the slider/valve element 23 are obtained, but also linear behaviour of the slider/valve element 23 resp. movable pole part 28 in the solenoid valve assembly 7 and very fast switching times. Saturation of magnetic flux does not have to occur, nor between the pole faces 40, 41 nor inside the flux-bypass nose 44, and thus negative side effects due to remanence can be fully prevented.

Figure 10:
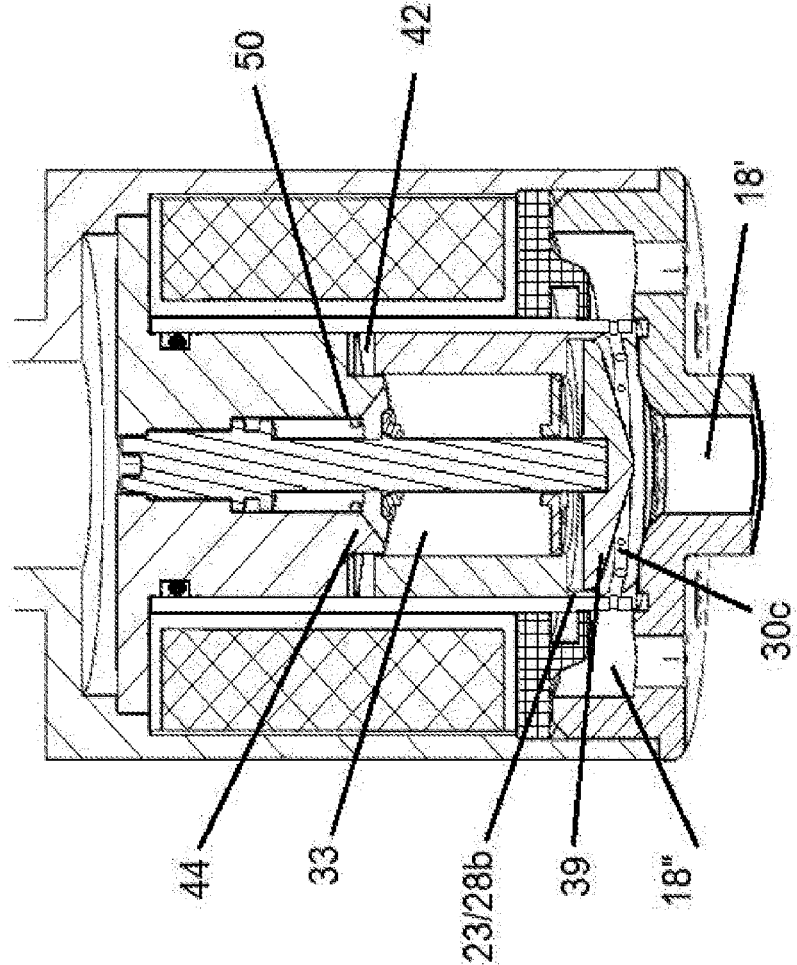
FIG. 10 shows a schematic perspective view of FIG. 4 (without the spring)
Figure 11:
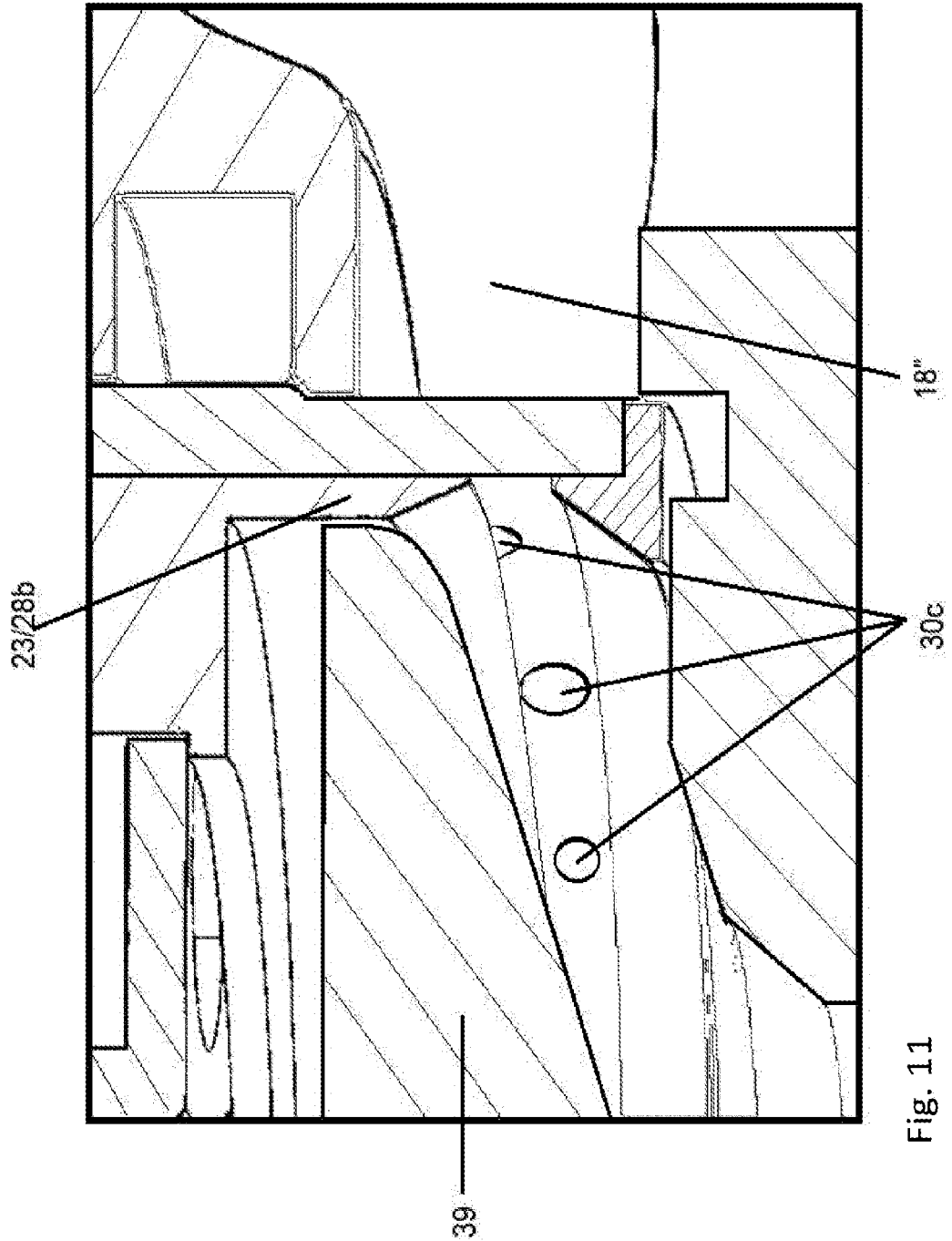
FIG. 11 shows an enlarged partial view of FIG. 10.

The relationship between the through holes 30*c* and the slider/valve element 23 can now also be made linear if desired. This can for example be achieved by means of providing a pattern of differently dimensioned through holes 30*c*. In FIGS. 10 and 11 an embodiment hereof is shown in which large, medium and small through holes 30*c* are provided in the stationary and/or movable pole part for connecting the air gap between the pole faces with the damping medium in the one or more channels to be proportionally opened or closed.

In FIGS. 10 and 11 it can also more clearly be seen that the flux-bypass nose 44 is provided with connection ducts 50 that on one end connect to the air gap 42 and on the other hand connect to the hollow 33. With this it is noted that the hollow 33 itself is filled with damping medium that enters there from out of the bypass channel 18 via the non-sealed sliding fit between the cone-shaped flow guider cap 39 and the end portion 28*b* of the movable pole part 28 that forms the slider/valve element 23. Thus, during switching movements of the movable pole part 28, the amount of damping medium inside the closing or opening air gap 42 is able to follow in order to prevent too much under- or overpressure to start occurring, while at the same time being able to add some restriction in the flow of damping medium towards and away from the air gap, such that vibrations in an own natural frequency can be prevented.

Figure 12:
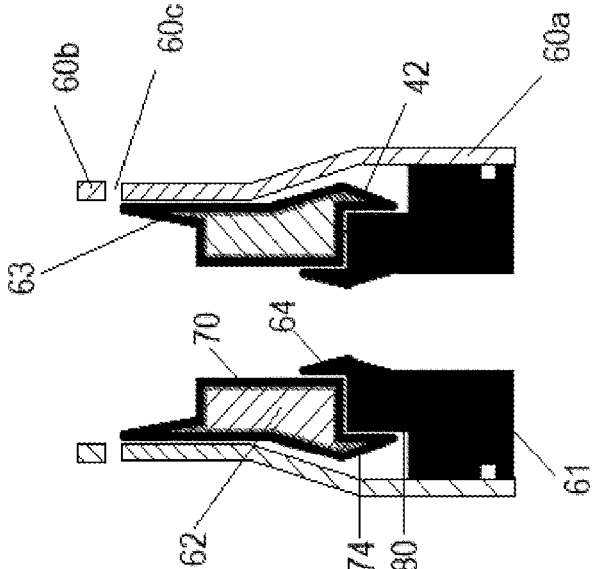
FIG. 12 shows a variant with a double set of flux-bypass noses.

Instead of equipping only one of the stationary and movable pole parts with a flux-bypass nose, it is also possible to provide such a flux-bypass nose on both of them. An embodiment hereof is schematically shown in FIG. 12.

There a sleeve 60 of non-magnetic flux guiding material is provided that extends in the axial direction with a first part 60*a* inside which a stationary pole part 61 is provided, and a second part 60*b* inside which a movable pole part 62 is guided with a sliding fit. The second part 60*b* is equipped with a number of through holes 60*c* that are divided around its circumference. The movable pole part 62 forms a slider/valve element 63 that is configured to proportionally open or close the through holes 60*c* by sliding in the axial direction to a bigger or lesser degree in front of them. In FIG. 12 a fully open position is shown.

The stationary pole part 61 comprises an annular flux-bypass nose 64 that starts at an inner diameter of its flat pole face and from there projects in the axial direction forwardly away from its pole face. The nose 64 on its outer circumferential side is delimited by an outer sidewall that extends straight parallel to the axial direction. The nose 64 on its inner circumferential side is delimited by an inner sidewall that extends angled relative to the axial direction. Thus the flux-bypass nose 64 has decreasing cross-sectional dimensions towards its free end. The flux-bypass nose 64 fits with a sliding fit of its outer sidewall along an inner sidewall 70 of a centre hollow inside the movable pole part 62.

The movable pole part 62 comprises an annular flux-bypass nose 74 that starts at an outer diameter of its flat pole face and from there projects in the axial direction forwardly away from its pole face. The nose 74 on its inner circumferential side is delimited by an inner sidewall that extends straight parallel to the axial direction. The nose 74 on its outer circumferential side is delimited by an outer sidewall that extends angled relative to the axial direction. Thus the flux-bypass nose 74 has decreasing cross-sectional dimensions towards its free end. The flux-bypass nose 74 fits with a sliding fit of its inner sidewall along an outer sidewall 80 of a stepped portion onto the stationary pole part 61.

Thus advantageously a substantially larger flux by-pass route gets created during switching movements of the pole parts 61, 62 towards each other.

Besides the shown and described embodiments, numerous variants are possible. For example the dimensions and shapes of the various parts can be altered. Also it is possible to make combinations between advantageous aspects of the shown embodiments. Instead of using the solenoid valve assembly on a bypass channel for the damping medium it is also possible to use it on one or more main channels or both. All kinds of materials can be used for the various components as long as they are made out of magnetic flux guiding material when they form part of the magnetic circuit. Instead of being used as shock absorber/damper device for vehicles, the invention can also be used in all kinds and sorts of other apparatus, like for example (industrial) washing machines, bridges, towers, off-shore applications, fitness machines, etc.

It should be understood that various changes and modifications to the presently preferred embodiments can be made without departing from the scope of the invention, and therefore will be apparent to those skilled in the art. It is therefore intended that such changes and modifications be covered by the appended claims.

The invention claimed is:

1. A shock absorber/damper device, comprising:
   a piston-cylinder assembly of which the piston separates the cylinder in a first and second chamber;
   main and/or bypass channels for damping medium to flow through from the first towards the second chamber and vice versa during compression and rebound strokes; and
   a solenoid valve assembly that comprises:
      a valve element movable in a first axial direction and configured to proportionally open or close one or more of the channels; and
      a solenoid operator that comprises:
         a coil for generating a magnetic field; and
         a substantially closed magnetic circuit for guiding the magnetic field generated by the coil, the magnetic circuit comprising stationary and movable pole parts that have first and second pole faces lying opposite each other with an air gap there between in the first axial direction,
      wherein the movable pole part is associated with the valve element and is moveable relative to the stationary pole part against the action of a spring in the first axial direction in dependence of electric current being fed to the solenoid operator, such that one or more of the channels get proportionally opened or closed, wherein,
      one of the stationary and movable pole parts comprises a flux-bypass nose that projects forwardly away from its first pole face and that on one side is delimited by a first sidewall that extends parallel to the first axial direction,
      the other one of the stationary and movable pole parts comprises a second sidewall that extends parallel to the first axial direction and that projects backwardly away from its second pole face,
      wherein the flux-bypass nose fits into the other one of the stationary and movable pole parts in the first axial direction with a sliding fit of their parallel sidewalls along each other, such that in dependence of the electric current being fed to the solenoid operator, the air gap between the opposing pole faces closes while magnetic forces between those two pole faces decrease due to said parallel sidewalls sliding along each other and forming an increasing sideways directed bypass surface area for magnetic flux, wherein the flux-bypass nose is annular shaped, and the parallel first and second side walls are cylindrical shaped, wherein said first sidewall faces radially outwardly and, at its axial inward end, is circumvented by said first pole face, wherein said second side wall faces radially inwardly, and, at its axial outward end, is circumvented by said second pole face, and wherein connection ducts are provided in the stationary and/or movable pole part for connecting the air gap between the pole faces with the damping medium in the one or more of the channels to be proportionally opened or closed.

2. The shock absorber/damper device according to claim 1, wherein outer circumferences of the stationary and movable parts are both made with a same outer diameter (DO) or cross-sectional dimension.

3. The shock absorber/damper device according to claim 1, wherein the circumventing opposing pole faces start at a same outer diameter (Do) and from there extend radially inwards to an inner diameter (Di) of the first respectively second sidewall.

4. The shock absorber/damper device according to claim 1, wherein the flux-bypass nose has decreasing cross-sectional dimensions seen in the first axial direction forwardly away from its first pole face.

5. The shock absorber/damper device according to claim 1, wherein the first and second pole faces extend flat in a second radial direction that is perpendicular to said first axial direction.

6. The shock absorber/damper device according to claim 1, wherein the movable pole part has a cylindrical outer shape and is guided with a sliding fit in the first axial direction through a sleeve of non-magnetic flux guiding material that at least partially extends through a centre coil space.

7. The shock absorber/damper device according to claim 1, wherein the flux-bypass nose is provided on the stationary pole part.

8. The shock absorber/damper device according to claim 1, wherein the movable pole part delimits a central hollow.

9. The shock absorber/damper device according to claim 8, wherein the flux-bypass nose is provided with the connection ducts for connecting the air gap between the pole faces with the damping medium in the one or more of the channels, and wherein those connection ducts connect to the central hollow inside the movable pole part that connects to the damping medium in the one or more of the channels.

10. The shock absorber/damper device according to claim 8, wherein a guiding rod, in particular an adjustable guiding rod, is provided that at one end is connected to the stationary pole part, that extends, with the spring lying around it, through the central hollow inside the movable pole part, and that forms a guidance for a spring abutment that is connected to or limited by the movable pole part.

11. A shock absorber/damper device, comprising:
a piston-cylinder assembly of which the piston separates the cylinder in a first and second chamber;

main and/or bypass channels for damping medium to flow through from the first towards the second chamber and vice versa during compression and rebound strokes; and a solenoid valve assembly that comprises:
a valve element movable in a first axial direction and configured to proportionally open or close one or more of the channels; and a solenoid operator that comprises:
a coil for generating a magnetic field; and a substantially closed magnetic circuit for guiding the magnetic field generated by the coil, the magnetic circuit comprising stationary and movable pole parts that have first and second pole faces lying opposite each other with an air gap there between in the first axial direction, wherein the movable pole part is associated with the valve element and is moveable relative to the stationary pole part against the action of a spring in the first axial direction in dependence of electric current being fed to the solenoid operator, such that one or more of the channels get proportionally opened or closed, wherein, one of the stationary and movable pole parts comprises a flux-bypass nose that projects forwardly away from its first pole face and that on one side is delimited by a first sidewall that extends parallel to the first axial direction, the other one of the stationary and movable pole parts comprises a second sidewall that extends parallel to the first axial direction and that projects backwardly away from its second pole face, wherein the flux-bypass nose fits into the other one of the stationary and movable pole parts in the first axial direction with a sliding fit of their parallel sidewalls along each other, such that in dependence of the electric current being fed to the solenoid operator, the air gap between the opposing pole faces closes while magnetic forces between those two pole faces decrease due to said parallel sidewalls sliding along each other and forming an increasing sideways directed bypass surface area for magnetic flux, wherein the flux-bypass nose is annular shaped, and the parallel first and second side walls are cylindrical shaped, wherein said first sidewall faces radially outwardly and, at its axial inward end, is circumvented by said first pole face, wherein said second side wall faces radially inwardly, and, at its axial outward end, is circumvented by said second pole face, and wherein the movable pole part delimits a central hollow.

12. The shock absorber/damper device according to claim 11, wherein outer circumferences of the stationary and movable parts are both made with a same outer diameter (DO) or cross-sectional dimension.

13. The shock absorber/damper device according to claim 11, wherein the circumventing opposing pole faces start at a same outer diameter (Do) and from there extend radially inwards to an inner diameter (Di) of the first respectively second sidewall.

14. The shock absorber/damper device according to claim 11, wherein the flux-bypass nose has decreasing cross-sectional dimensions seen in the first axial direction forwardly away from its first pole face.

15. The shock absorber/damper device according to claim 11, wherein the first and second pole faces extend flat in a second radial direction that is perpendicular to said first axial direction.

16. The shock absorber/damper device according to claim 11, wherein the movable pole part has a cylindrical outer shape and is guided with a sliding fit in the first axial direction through a sleeve of non-magnetic flux guiding material that at least partially extends through a centre coil space.

17. The shock absorber/damper device according to claim 11, wherein the flux-bypass nose is provided on the stationary pole part.

18. The shock absorber/damper device according to claim 11, wherein a guiding rod, in particular an adjustable guiding rod, is provided that at one end is connected to the stationary pole part, that extends, with the spring lying around it, through the central hollow inside the movable pole part, and that forms a guidance for a spring abutment that is connected to or limited by the movable pole part.

19. A shock absorber/damper device, comprising:
a piston-cylinder assembly of which the piston separates the cylinder in a first and second chamber;
main and/or bypass channels for damping medium to flow through from the first towards the second chamber and vice versa during compression and rebound strokes; and
a solenoid valve assembly that comprises:
a valve element movable in a first axial direction and configured to proportionally open or close one or more of the channels; and
a solenoid operator that comprises:
a coil for generating a magnetic field; and
a substantially closed magnetic circuit for guiding the magnetic field generated by the coil, the magnetic circuit comprising stationary and movable pole parts that have first and second pole faces lying opposite each other with an air gap there between in the first axial direction,
wherein the movable pole part is associated with the valve element and is moveable relative to the stationary pole part against the action of a spring in the first axial direction in dependence of electric current being fed to the solenoid operator, such that one or more of the channels get proportionally opened or closed, wherein,
one of the stationary and movable pole parts comprises a flux-bypass nose that projects forwardly away from its first pole face and that on one side is delimited by a first sidewall that extends parallel to the first axial direction,
the other one of the stationary and movable pole parts comprises a second sidewall that extends parallel to the first axial direction and that projects backwardly away from its second pole face,
wherein the flux-bypass nose fits into the other one of the stationary and movable pole parts in the first axial direction with a sliding fit of their parallel sidewalls along each other, such that in dependence of the electric current being fed to the solenoid operator, the air gap between the opposing pole faces closes while magnetic forces between those two pole faces decrease due to said parallel sidewalls sliding along each other and forming an increasing sideways directed bypass surface area for magnetic flux, wherein the flux-bypass nose is annular shaped, and the parallel first and second side walls are cylindrical shaped,
wherein said first sidewall faces radially outwardly and, at its axial inward end, is circumvented by said first pole face,
wherein said second side wall faces radially inwardly, and, at its axial outward end, is circumvented by said second pole face,
wherein the movable pole part has a cylindrical outer shape and is guided with a sliding fit in the first axial direction through a sleeve of non-magnetic flux guiding material that at least partially extends through a centre coil space,
wherein the valve element is formed by a slider configured to slide in the first axial direction along one or more flow through holes of the one or more channels to be proportionally opened or closed, and
wherein the slider is formed by a cylindrical portion of the movable pole part, and wherein the one or more flow through holes are provided in a part of the sleeve of non-magnetic material that extends outside the centre coil space.

20. A shock absorber/damper device, comprising:
a piston-cylinder assembly of which the piston separates the cylinder in a first and second chamber;
main and/or bypass channels for damping medium to flow through from the first towards the second chamber and vice versa during compression and rebound strokes; and
a solenoid valve assembly that comprises:
a valve element movable in a first axial direction and configured to proportionally open or close one or more of the channels; and
a solenoid operator that comprises:
a coil for generating a magnetic field; and
a substantially closed magnetic circuit for guiding the magnetic field generated by the coil, the magnetic circuit comprising stationary and movable pole parts that have first and second pole faces lying opposite each other with an air gap there between in the first axial direction,
wherein the movable pole part is associated with the valve element and is moveable relative to the stationary pole part against the action of a spring in the first axial direction in dependence of electric current being fed to the solenoid operator, such that one or more of the channels get proportionally opened or closed, wherein,
one of the stationary and movable pole parts comprises a flux-bypass nose that projects forwardly away from its first pole face and that on one side is delimited by a first sidewall that extends parallel to the first axial direction,
the other one of the stationary and movable pole parts comprises a second sidewall that extends parallel to the first axial direction and that projects backwardly away from its second pole face,
wherein the flux-bypass nose fits into the other one of the stationary and movable pole parts in the first axial direction with a sliding fit of their parallel sidewalls along each other, such that in dependence of the electric current being fed to the solenoid operator, the air gap between the opposing pole faces closes while magnetic forces between those two pole faces decrease due to said parallel sidewalls sliding along each other and forming an increasing sideways
directed bypass surface area for magnetic flux,
wherein the flux-bypass nose is annular shaped, and the
parallel first and second side walls are cylindrical
shaped,
wherein said first sidewall faces radially outwardly and,
at its axial inward end, is circumvented by said first
pole face,
wherein said second side wall faces radially inwardly,
and, at its axial outward end, is circumvented by said
second pole face, and
wherein a flow guider cap is positioned spaced in front
of an axially directed part of the one or more of the
channels towards a radially directed part of the one
or more of the channels.

* * * * *

18